United States Patent [19]

Suzaki et al.

[11] Patent Number: 4,746,570
[45] Date of Patent: May 24, 1988

[54] HEAT-RESISTANT, HIGHLY EXPANSIBLE SHEET MATERIAL FOR SUPPORTING CATALYST CARRIER AND PROCESS FOR THE PREPARATION THEREOF

[75] Inventors: Tooru Suzaki; Yoshihiro Kanome, both of Toyota; Masaomi Hayakawa, Gifu; Kunihiko Miyashita, Oogaki, all of Japan

[73] Assignees: Toyota Jidosha Kabushiki Kaisha, Toyota; Ibiden Kabushiki Kaisha, Oogaki, both of Japan

[21] Appl. No.: 102,261

[22] Filed: Sep. 28, 1987

Related U.S. Application Data

[63] Continuation of Ser. No. 774,076, Sep. 9, 1985, abandoned.

[30] Foreign Application Priority Data

Sep. 20, 1984 [JP] Japan .................................. 59-195689

[51] Int. Cl.$^4$ ...................... B32B 19/06; B32B 27/04; B32B 29/06
[52] U.S. Cl. .............................. 428/327; 106/DIG. 3; 162/159; 162/181 R; 428/331; 428/454; 428/913
[58] Field of Search ............... 428/324, 327, 331, 454, 428/913; 106/DIG. 3; 162/159, 181 R

[56] References Cited

U.S. PATENT DOCUMENTS

| | | | |
|---|---|---|---|
| 3,001,571 | 9/1961 | Hatch | 154/2.6 |
| 3,441,381 | 4/1969 | Kaleta et al. | 23/288 |
| 3,916,057 | 10/1975 | Hatch | 428/236 |
| 4,305,992 | 12/1981 | Suzaki et al. | 428/324 |

FOREIGN PATENT DOCUMENTS 1023425 3/1966 United Kingdom .

Primary Examiner—Marion C. McCamish
Attorney, Agent, or Firm—Balogh, Osann, Kramer, Dvorak, Genova & Traub

[57] ABSTRACT

A heat-resistant, highly expansible sheet material for supporting a catalyst carrier containing unexpanded vermiculite, in which the cations contained between the layers of the vermiculite are at least partly exchanged by ammonium cations, is provided. A process for the preparation of the sheet material, which involves blending an unexpanded vermiculite which has been preliminarily immersed in an aqueous solution containing alkali metal ions, inorganic fiber, an organic binder, and an inorganic binder, whereto a slurry solution of beaten natural organic fiber is added, and forming a sheet material from the mixture, is described.

8 Claims, 2 Drawing Sheets

HEAT-RESISTANT, HIGHLY EXPANSIBLE SHEET MATERIAL FOR SUPPORTING CATALYST CARRIER AND PROCESS FOR THE PREPARATION THEREOF

This application is a continuation of application Ser. No. 774,076, filed Sept. 9, 1985 now abandoned.

BACKGROUND OF THE INVENTION

Field of the Invention:

The present invention relates to a heat-resistant, highly expansible sheet material used for supporting a catalyst carrier for a converter of automobiles for purifying exhaust gases, and to a process for the preparation of the sheet material.

Description of the Prior Art:

It is disclosed in Japanese Utility Model Publication No. 20523/1973 that a resilient ceramic heat insulator, for example fiberfrax, is used between a housing and a catalyst element embedded in a cartridge of a catalyst for the treatment of exhaust gases. It is also disclosed in Japanese Patent Application Laid-open No. 59211/1973 that a castable refractory excellent in heat resistance and heat insulation can be interleaved and hardened between an outer shell and an inner shell, which forms a reaction chamber inside, of an exhaust gas-purifying device. The refractory, comprising an aggregate principally composed of vermiculite or other light-weight aggregate and a highly heat-resistant binder for binding the aggregate, is used in the form of a slurry, with the addition of water or an activator to the powdery refractory for improving its fluidity.

It is disclosed in U.S. Pat. No. 3,441,381 that a catalytic apparatus having a cylindrical catalyst, the external diameter of which is smaller than the internal diameter of the casing, and a flexible resilient material provided under compression between the casing and the catalyst to tightly support the catalyst in the cylindrical casing is used for purifying exhaust gases. The flexible resilient material is a corrugated metal structure comprising metallic gauzes, which has many small holes.

It is disclosed in U.S. Pat. No, 3,916,057 that a heat-expansible sheet material, which shows such resilience that it can endure prolonged and repeated mechanical or thermal shock, comprising from 30 to 85% by weight of unexpanded mica, 60% by weight or less of an inorganic fibrous material, and from 10 to 70% by weight of an inorganic binder, is interleaved between the inner wall of a metallic container and a ceramic structure, in the process of mounting the ceramic structure in the metallic container.

It is also disclosed in U.K. Patent No. 1,023,425 that a heat-resistant and heat-insulating composition comprising a finely divided refractory material having a low density, for example a thingage vermiculite fibrous refractory such as asbestos, slag wool or glass fiber, artificial inorganic fiber, and a sodium silicate binder is used.

However, the above-mentioned heat-insulating material used in the cartridge disclosed in Japanese Utility Model Publication No. 20523/1973, which is in the form of a sheet principally composed of inorganic fiber, has a disadvantage of forming a gap between the housing and the catalytic element because of the deterioration in the strength of the sheet due to external stress such as vibration. The exhaust gas purifying device disclosed in Japanese Patent Laid-open No. 59211/1973 is also disadvantageous in that the highly heat-resistant and heat-insulating castable refractory used in the device loses its resilience once it is exposed to high temperatures, thus forming a gap between the outer shell and the inner shell, through which exhaust gases may pass. The resilient material made of metal disclosed in U.S. Pat. No. 3,441,381 is disadvantageous in that the metal material is gradually deteriorated in resilience and has a large thermal conductivity. The temperature of the device itself is raised due to the high thermal conductivity characteristic of the metal, which leads to the necessity of providing another heat-insulating layer outside and the complication of the structure. The sheet material disclosed in U.S. Pat. No. 3,916,057 is disadvantageous not only in poor expansibility at low temperatures due to the large amount of the binder but also in less satisfactory resilience and flexibility at high temperatures. The gasket material disclosed in U.K. Patent No. 1,023,425 is disadvantageous in the difficulty of being rolled around the catalyst carrier due to the poor flexibility of the material.

SUMMARY OF THE INVENTION

The present invention, which has been accomplished with the aim of overcoming the disadvantages of the prior art above described, provides a highly expansible sheet material used for supporting a catalyst carrier in a converter of automobiles for purifying exhaust gases, which is not only highly flexible and resilient at room temperature but also excellently heat-resistant and resilient after repeated flexing at high temperatures, and a process for the preparation of said sheet material.

The inventors have arrived at the present invention as the result of intensive studies with the purpose of further improving the properties required for said sheet material, based on a finding that the use of an unexpanded vermiculite, in which the cations contained between the layers of the unexpanded vermiculite are ion-exchanged with an organic amine salt, can improve the properties of the material most effectively. More specifically, the present invention relates to a heat-resistant, highly expansible sheet material for supporting a catalyst carrier comprising unexpanded vermiculite, inorganic fiber, natural organic fiber, an organic binder and an inorganic binder, characterized in that said unexpanded vermiculite is one in which at least part of the cations contained between the layers of the vermiculite are substituted with alkylammonium ions dissociated from at least one amine selected from among primary, secondary and tertiary amines, and to a process for the preparation thereof.

DETAILED DESCRIPTION OF PREFERRED EMBODIMENTS

The present invention will now be described in more detail.

It is disclosed in U.S. Pat. No. 3,001,571 that unexpanded vermiculite and synthetic tetrafluorosilicate mica expand by the action of heat or microwave. They are endowed with resilience, heat resistance, and other characteristics when dehydrated by heating, which causes delamination and expansion, and expanded to have a length of 10 to 25 times that before the expansion. However, the interlaminar bonding strength is deteriorated by dehydration caused by heating, and the material is likely to be separated into flakes even with a small external force, retaining with difficulty its shape by itself.

Figure 1A:
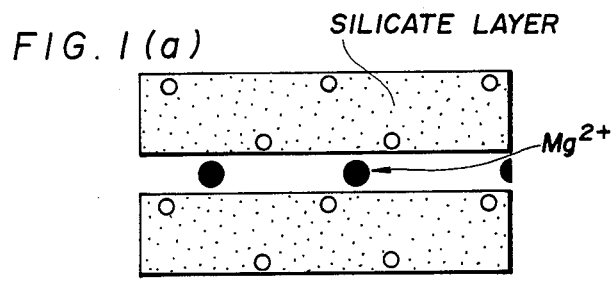
FIG. 1 is an illustration showing the layers of vermiculite, in which (a) represents an untreated vermiculite, (b) represents a vermiculite in which the cations are substituted with Na+ ions, and (c) represents a vermiculite in which the cations are substituted with alkylammonium ions.
Figure 1B:
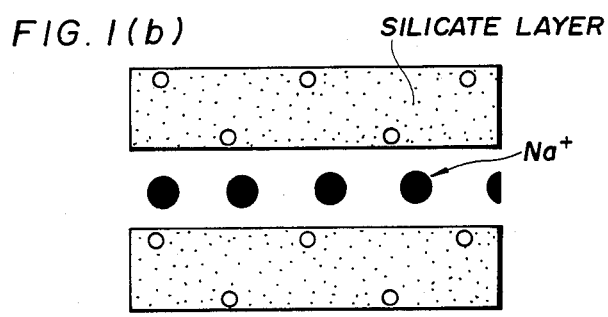
Figure 1C:
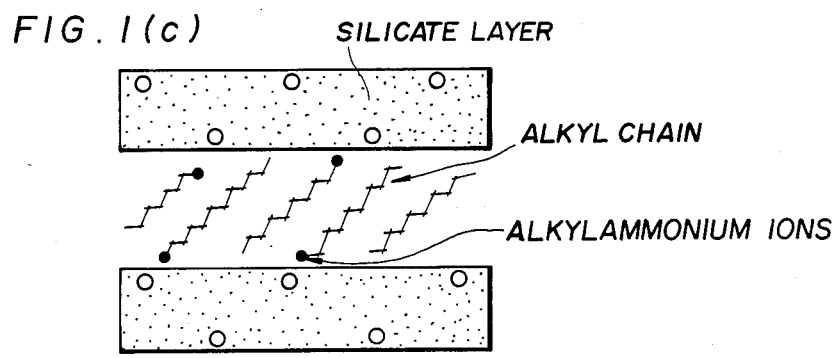

Vermiculite, as shown by the diagrammatical sectional view of FIG. 1-(a), is a water-containing mineral having a structure of laminated thin layers of particles, the basic structure of which comprises a silicate layer and a talcous layer comprising MgO or CaO, the ratio of the two layers being 2:1. The two layers are combined through the intermediary of oxygen and hydroxide groups. The marks ● and ⊖ in the Figure represent $Mg^{2+}$ ions and silicate ions, respectively.

Although the expansibility of unexpanded vermiculite is increased in proportion to its particle diameter, those having a small particle diameter, preferably from 0.1 to 2.8 mm, are advantageous for the preparation of sheet material because of good dispersion properties. However, the expansibility and resilience of the sheet material in which the vermiculite having such a small particle diameter is used are less satisfactory. The present inventors have arrived at a novel finding, as the result of intensive studies to provide a vermiculite having characteristics satisfying the object of the present invention, that the cations contained in the layers of the vermiculite can be replaced with alkylammonium ions. When vermiculite is dispersed in water and an alkylamine salt or betaine is added thereto, the amine ionized in the solution is exchanged by the inorganic cation contained in the vermiculite. For example, as shown in FIG. 1-(c), when the alkylammonium ion is dodecylammonium ion ($C_{12}H_{25}NH_3+$), the alkyl chains are arranged with a certain angle to the surface of the silicate layer. The sheet material using the vermiculite in which the cations in the layers are thus replaced by alkylammonium ions is extremely improved in the re-expansibility when the sheet material is heat expanded, cooled to room temperature, and again heated, and in the repeated expansibility when the heating-cooling to room temperature-reheating process is repeated, when compared with those of conventional sheet materials.

Conventional untreated vermiculite begins expanding caused by elimination of water molecules contained in the layers, at a temperature lower than 200° C. The dehydration is effected more rapidly as the temperature rises, most of the water molecules contained in the layers being eliminated at about 320° C. or lower. When a sheet material made from such vermiculite is used as a sealing material for supporting a catalyst, the sealing material will rapidly expand when exposed to high temperatures, and will be deteriorated rapidly in expansibility after it has been repeatedly cooled and again exposed to high temperatures. Moreover, the resilience and flexibility of the sheet material will be significantly decreased due to flaking of the vermiculite itself, with a result that part of the sheet material is blown away by the pressure of the exhaust gases. The exhaust gases will then pass through the voids of the sheet material instead of passing through the catalyst carrier. In such a case, the sheet material cannot serve as sealing material. On the other hand, the vermiculite used in the present sheet material, which contains ionexchanged alkylammonium ions between its layers, increases it expansibility when heated, not only because the elimination of adherent water or water of crystallization is considerably retarded but also as the alkylamine is burned off at high temperatures. When the present sheet material, in which the vermiculite characterized by the above-described treatment is used, is employed as a sealing material for supporting a catalyst, the deterioration in expansibility of the sheet material is significantly retarded due to the prolonged procedure of dehydration even after it has been repeatedly exposed to high and low temperatures. Moreover, at high temperatures the expansibility of the sheet material is increased not only by the elimination of water of crystallization between the layers but also by the burning off of the organic amine. The present sheet material shows remarkable re-expansibility, which is sufficient to fill the gap between the container and the catalyst carrier, which is widened at high temperatures due to the difference in the thermal expansibility of them. The exhaust gases therefore rarely pass through the voids of the sealing material when the present sheet material is used.

In the treatment of the vermiculite to be used in the present sheet material, it is further advantageous to preliminarily substitute $Mg^{2+}$ or $Ca^{2+}$ ions in the vermiculite with $Na^+$ or other alkali metal ions.

The organic amine used in the treatment of the vermiculite in the present sheet material includes those giving ampholytic ions in an aqueous solution, such as lauryl alkylammonium betaine or alkylglycine, tetradecylamine acetate or other alkylamine acetates giving cations in an aqueous solution, and dodecyltrimethylammonium chloride or other alkylamine hydrochloride giving cations in an aqueous solution. As the inorganic ammonium salt, ammonia water, ammonium halides, inorganic acid salts of ammonium, metal ammonium complex salts and the like, for example, can be used.

Other methods of expanding vermiculite are disclosed in Japanese Patent Publication No. 18353/1974, in which vermiculite is cation-exchanged and then expanded with a peroxide, and in Japanese Patent Application Laid-open No. 34915/1974, in which vermiculite is heated in the presence of nitric acid and alkylammonium ions. However, the object of these inventions is to significantly expand vermiculite substantially at low temperatures, instead of by heating vermiculite at high temperatures, and to provide a vermiculite to be used as constructional, heat-insulating, electrical-insulating, or packing materials.

On the other hand, the ammonium cation-exchanged vermiculite used in the present sheet material is incorporated in the material in an unexpanded state, with the purpose of maintaining the expansibility and preventing the deterioration in resilience of the sheet material, which is used for supporting a catalyst carrier, even after the sheet material has been repeatedly exposed to high and low temperatures.

Accordingly, the present sheet material contains an improved unexpanded vermiculite having remarkable expansibility and re-expansibility that cannot be expected heretofore. The amount of the vermiculite to be incorporated in the present sheet material must be within the range of 40 to 80% by weight, because if its amount is smaller than 40% by weight the expansibility is not satisfactory, while if it exceeds 80% by weight the shape of the sheet material is retained with difficulty due to too large expansibility.

The process for the treatment of the vermiculite to be used in the present sheet material will now be described in detail.

It is preferred to preliminarily exchange $Mg^{2+}$ ions contained in the vermiculite with $Na^+$ ions or other alkali metal ions in the presence of an acid $(H^+)$ and then incorporate $NH_4^+$ ions. Natural vermiculite contains $Mg^{2+}$ ions between its layers. In order to exchange these $Mg^{2+}$ ions with alkylammonium ions, vermiculite is added to an aqueous solution of an alkali metal acetate (e.g. sodium acetate), heated at 70° C. for 24 hours, for example, to exchange the $Mg^{2+}$ ions with $Na^+$ ions having a large ionic radius, and thereafter an alkylamine acetate (e.g. tetradodecylamine acetate) is added to the aqueous solution and mixed by stirring for 5 hours. It was found that 5.4% of alkylamine ions were added to the treated vermiculite thus obtained as compared with untreated vermiculite. Another method of exchanging the ions of vermiculite with alkylammonium ions is to prepare a slurry of a material composition comprising a vermiculite in which $Mg^{2+}$ ions are exchanged with $Na^+$ ions by the abovedescribed treatment with sodium acetate, inorganic fiber, an organic binder and an inorganic binder, from which a sheet material is formed by papermaking process and flattened in a wet state, impregnate the sheet material with an aqueous 7% (by weight) tetradodecylamine acetate solution before or after drying, the amount of the aqueous solution of tetradodecylamine acetate being the same as that of the sheet material, and effect the reaction at 80° C. for 4 hours.

The inorganic fiber used in the present invention must be so heat-resistant as to have a crystallization temperature of 850° C. or higher, because it must retain its fibrous shape at high temperatures to cope with the expansion of vermiculite. As non-fibrous substances which are sometimes contained in the inorganic fiber cannot be interlocked with vermiculite nor cope with the expanding vermiculite, it is desirable to thoroughly remove these non-fibrous substances. Practically, the content of the non-fibrous substances having a length of 44 μm or more must not exceed 30%. Silica-alumina ceramic fiber, alumina and mullite crystal fiber, silica fiber, and the like can be used as the inorganic fiber for the present invention in an amount of 10 to 50% by weight. The amount of the inorganic fiber must be within the above range to retain the shape of the sheet when vermiculite expands at high temperatures. More specifically, if the amount of the inorganic fiber is smaller than 10% by weight, the sheet material will be broken because the fiber cannot cope with the highly expanding vermiculite, while if it exceeds 50% by weight, the compression strength of the sheet material becomes so large that the high expansibility and re-expansibility of the sheet material is decreased.

The inorganic binder will now be described. As described previously, the amount of the inorganic binder is preferred to be as small as possible to maximize the expansibility and re-expansibility of the sheet material. As disclosed in U.S. Pat. No. 3,916,057, a sheet material in which 10 to 70% by weight of an inorganic binder is incorporated is not only deteriorated in the flexibility of the inorganic fiber but also in the expansibility of the vermiculite. Moreover, the use of an excess inorganic binder increases the compression strength of the sheet material at room temperature, resulting in the deterioration in resilience. The amount of the inorganic binder is therefore advantageously within the range of from 0.1 to 4% by weight, more preferably from 1 to 2% by weight. As the inorganic binder of the present invention, one or more members selected from among sepiolite, bentonite, montmorillonite, alumina sol, silica sol, and the like can be used.

The organic binder used in the present sheet material, as well as the inorganic binder, decreases the expansibility of the vermiculite at low temperatures. Moreover, a large amount of an organic binder incorporated in the sheet material, when it is burned off at high temperatures, is not suitable as sealing material for exhaust gases, the object of the present invention. The preferable amount of the organic binder used in the present invention is such that it can substantially retain the shape of the sheet material in the treatment at room temperature, i.e. from 0.1 to 4% by weight, more advantageously from 2 to 3% by weight. Acrylonitrile butadiene latex, vinyl acetate, methylcellulose, starch, acrylamide resin, polyurethane, or other organic binders can be used preferably.

The natural organic fiber to be used in the present invention increases the strength of unheated sheet material. As the natural organic fiber does not adhere to the inorganic fiber, it does not prevent mutual interlocking of the inorganic fibers at low temperatures nor inhibit the expansion of the sheet material itself. However, as the natural organic fiber is burned off once the sheet material is practically used, the incorporation in large amounts is not necessary. The preferable amount of the natural organic fiber is therefore within the range of from 0.1 to 5% by weight, more preferably from 1 to 2% by weight. The natural organic fiber suitably used in the present sheet material includes silk fiber, wool, cashmere, mohair, straw, palm, Manila hemp, linen, hemp, cotton, kapok, pulp, and cotton linter, from which one or more can be selected for use.

A sheet material having sufficient flexibility and strength for the treatment at room temperature can be obtained without deteriorating the excellent resilience and expansibility of the sheet material by sticking an organic polymer film on one or both surfaces of the sheet material comprising the abovedescribed components, or by hermetically sealing all the surfaces of the sheet material with organic polymer film. The organic polymer film can be sticked or sealed on the sheet material with a known adhesive, or by shrink packing, vacuum packing, or other methods. However, the sticking or sealing with too large amounts of the organic polymer film disadvantageously affects the resilience and flexibility of the sheet material. It was found as the result of the experiment conducted by the present inventors that the preferable amount of the organic polymer film is 5% by weight or smaller based on the amount of the sheet material to be sticked or sealed. The preferable material of the organic polymer film includes regenerated cellulose, cellulose derivatives, polyolefin, polyvinyl chloride, polyvinylidene chloride, polyvinyl alcohol, polyester, polyethylene, polypropylene, polyamide, fluoroplastics, and the like.

The present invention will now be described in more detail by the following examples.

EXAMPLE 1

A sheet material having the composition listed in the table shown below was prepared by the following steps. 20 kg of 0.4 to 1.0 mm vermiculite selected from among commercially available uncalcined unexpanded vermiculites of South Africa was placed in a 50 l heat-resistant container, and heated with 40 l of water to 70° C. 2 kg of sodium acetate was added thereto, and the mixture was blended by stirring for 24 hours. After the reaction had been completed, the reaction liquid was cooled, deprived of the supernatant liquid, and dried with a hot-air drier at 105° C. for 5 hours. 250 g of the unexpanded vermiculite thus prepared, 90 g of silica-alumina ceramic fiber containing not larger than 25% of nonfibrous substances (commercial name: Ibiwool), 7 g of montmorillonite, and 25 ml of acrylonitrile butadiene latex (solid content: 40%) were sufficiently mixed by stirring in 30 l of water, whereto 100 ml of a solution of 10% (by weight) commercially available aluminum sulfate was added, and further mixed by stirring. Separately, 4 g of beaten Manila hemp was sufficiently stirred in 10 l of water to prepare a slurry solution. The two slurry solutions thus prepared were blended and stirred, and thereafter molded into a sheet material having a thickness of 10 mm with a square manual papermaking machine. The molded sheet material was sandwiched in a wet state and pressed between flat stainless steel plates and dried at 105° C. for 3 hours to form a 45 cm × 23 cm sheet material having a thickness of 5 mm and a bulk density of 0.7 g/cm$^3$. The obtained sheet material was impregnated with 360 ml of a 10% aqueous solution of dimethylalkylbetaine (commercial name: Anon BF), and again heat-treated at 80° C. for 4 hours, thus forming a sheet material of the present invention.

The sheet material thus obtained was cut into pieces of 25×50 mm square, clamped with a jig so that the thickness of the sheet was 4.1 mm, and heated at 600° C. for 2 hours. The test pieces thus prepared were set in a jig having a clearance of 5 mm and placed in a tubular furnace. The temperature inside the furnace was adjusted to reach 600° C. in 30 minutes. When the temperature reached 600° C., air heated by a heat exchanger was blown from an air supplier provided with a manometer and an air filter to the test pieces at a distance of 5 mm with a cycle of blowing for 0.5 second and suspending the blowing for 1.0 second. The temperature changes were measured with a temperature sensor provided in the jig in which the test pieces were set, as well as the time until the temperature was suddenly fallen down, that is, until the air penetrated the test piece through the holes made by the escape of the material. The results are shown in the table below.

The present sheet material was cut into pieces of 25 mm square, heated at 700° C. for 1 hour, and the thickness of the pieces was measured, from which the coefficient of free expansion was calculated according to the following formula. The results are shown in the table below.

$$\frac{\text{thickness after heating (mm)} - \text{thickness before heating (mm)}}{\text{thickness before heating (mm)}} \times 100 = \text{coefficient of free expansion (\%)}$$

The sheet material was further cut into pieces of 25 mm square and heated at temperatures of 200° C., 300° C., 400° C., 500° C., 600° C., and 700° C., for 10 minutes each. The heated sheet material pieces were then compressed to a thickness of 4.5 mm, and the pressure at the compression, i.e. expansion pressure (kg/cm$^2$) was measured. The results are shown in the table below.

The present sheet material was clamped with a jig having a clearance of 4.1 mm, and fired at 600° C. for 4, 6, 8 and 10 hours each. The sheet material was then released from the jig and again fired at 700° C. for 1 hour in an unloaded state. The coefficient of re-expansion was calculated according to the following formula. The results are shown in the table below.

$$\frac{\text{thickness after re-heating at 700° C. (mm)} - 4.1 \text{ mm}}{4.1 \text{ (mm)}} \times 100 = \text{coefficient of re-expansion (\%)}$$

EXAMPLE 2

20 kg of 0.4 to 1.0 mm vermiculite selected from commercially available unexpanded uncalcined South African vermiculites was placed in a 50 l heat-resistant container, whereto 40 l of water was added, and heated to 70° C. 2 kg of potassium acetate was added thereto, and the mixture was blended by stirring for 24 hours and washed with water. 40 l of water was added and the reaction liquid was again heated to 70° C., whereto octadecylamine acetate (commercial name: Cation SA) was added, and mixed by stirring for 5 hours. After the reaction had been completed, the reaction liquid was cooled to room temperature and dried at 105° C. for 5 hours, to produce the vermiculite of the present invention. A sheet material having a thickness of 5 mm and the same formulation as that of Example 1 was prepared using the obtained vermiculite. The properties of the sheet material are shown in the table below.

EXAMPLE 3

A sheet material having a thickness of 5 mm and the same formulation as that of Example 1 was prepared in the same manner as described in Example 1, except that trimethyldodecylammonium chloride (commercial name: Cation BB) was used as the organic amine salt. The bulk density of the obtained sheet material was 0.7 g/cm$^3$. The properties of the sheet material are shown in the table below.

EXAMPLE 4

A 45×23 cm sheet material, 5 mm in thickness, having the same formulation as that of Example 1, was prepared in the same manner as described in Example 1. Polyethylene film having a thickness of 50 μm was laminated on the surface, as well as the same film having a thickness of 30 μm on the back surface, of this sheet material by an ordinary vacuum packing method. The properties of the obtained polyethylene-laminated sheet material are shown in the table below.

Comparative Example 1

A sheet material having the composition shown in the table below was prepared according to the following steps. 215 g of commercially available uncalcined unexpanded South African vermiculite, 104 g of silica-alumina ceramic fiber (commercial name: Ibiwool), 80 ml of styrene-butadiene latex (40% solution), and 7 g of montmorillonite were sufficiently blended by stirring in 40 l of water. 100 ml of aluminum sulfate (10% solution) was added thereto and the reaction liquid was further blended by stirring. The obtained slurry solution was formed into a sheet material having a thickness of 10 mm by a square manual paper-making machine. The obtained sheet material was pressed in a wet state between flat stainless steel plates and dried, to produce a 45×23 cm sheet material having a thickness of 5 mm. The bulk density of the sheet material was 0.7 g/cm³, and its properties are shown in the table below.

Comparative Example 2

A commercially available untreated unexpanded South African vermiculite having the same formulation as that of Example 1 was used without the organic amine treatment. A 45×23 cm sheet material having a thickness of 5 mm was obtained in the same manner of paper-making and drying as described in Example 1. The bulk density of the obtained sheet material was 0.7 g/cm³, and its properties are shown in the table below.

Comparative Example 3

A sheet material having the composition shown in the table below was prepared according to the following steps. 230 g of commercially available unexpanded uncalcined South African vermiculite, 110 g of silica-alumina ceramic fiber (commercial name: Ibiwool), and 45 ml of styrene-butadiene rubber latex (40% solution) were sufficiently blended in 40 l of water. 85 ml of aluminum sulfate (10% solution) was added thereto and the reaction liquid was further blended by stirring. The obtained slurry solution was formed into a sheet material in the same manner of paper-making, pressing, and drying as described in Comparative Example 1. The bulk density of the obtained sheet material was 0.7 g/cm³, and its properties are shown in the table below.

only an organic binder, in which no inorganic binder was incorporated, showed the worst result.

(2) As understood from the above table, the coefficient of free expansion of the present sheet material at high temperatures is far superior to those of the sheet materials of Comparative Examples 1 through 3.

Figure 2:
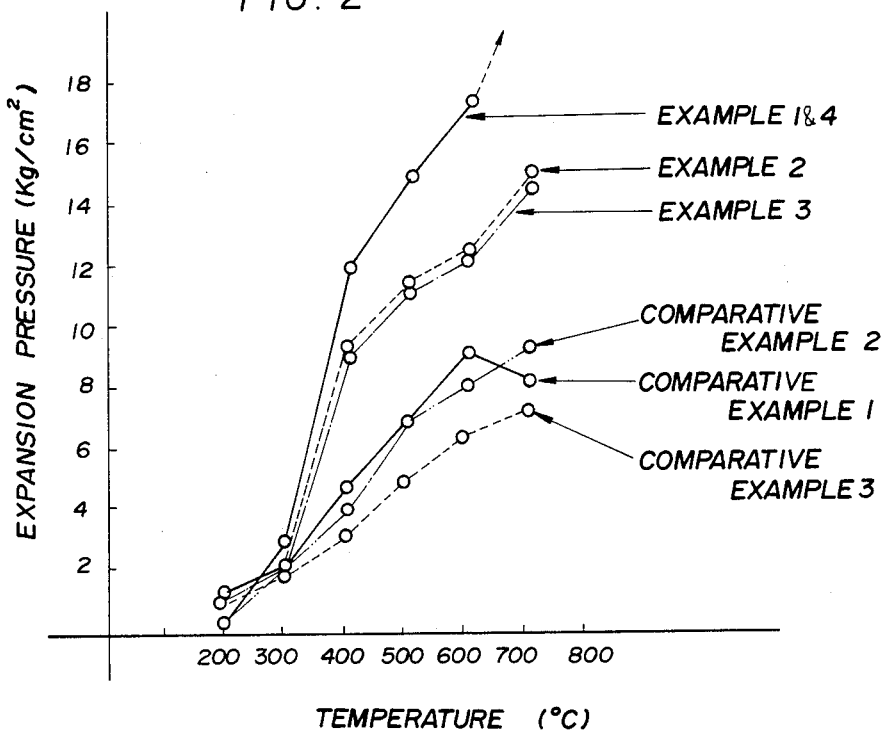
FIGS. 2 and 3 each graphically illustrates the relationships between the temperatures and the expansion pressures and between the time and the re-expansion coefficient of the test pieces of Examples and Comparative Examples of the present invention in comparison.

(3) As understood from the above table and FIG. 2, the expansion pressure of the present sheet material is a little lower than those obtained in Comparative Examples at a temperature of 200° C., but almost twice those of Comparative Examples at 400° C. or higher. It is assumed from these high expansibility and expansion pressure at high temperatures that the present sheet material, when used for supporting a catalyst carrier, does not form a gap between the container and the catalyst carrier, persistently adhering to the catalyst carrier.

Figure 3:
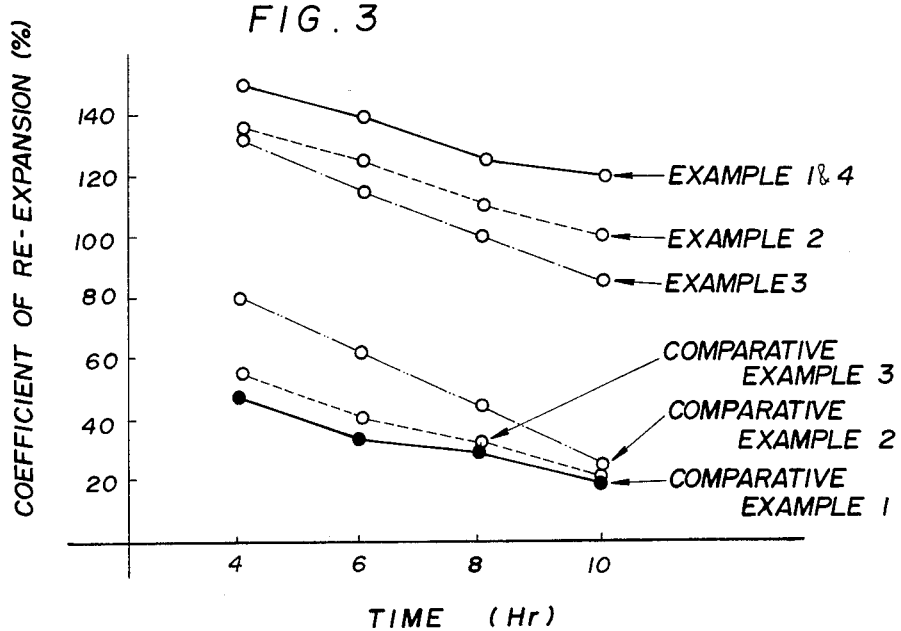

(4) The superiority in the coefficient of re-expansion of the present sheet material to those of Comparative Examples 1 through 3 is more remarkable as the period of service is prolonged, as shown in the above table and FIG. 3. The coefficient of expansion of the present sheet material which has been heated for 10 hours is as remarkable as about 3 to 6 times that of those obtained in Comparative Examples. Accordingly, it is understood that the present sheet material maintains its resilience for a long period at high temperatures.

(5) The sheet materials of Comparative Examples 1 and 3, which contain large amounts of organic binders, become porous when the organic binders are burned off at high temperatures, resulting in the shortest hot air erosion time and escape of the material as shown in the above table. It is also clear from the above table and FIG. 3 that the coefficients of re-expansion of the sheet materials of Comparative Examples 1 and 3 are smaller

TABLE

Composition and Characteristics of Sheet Materials

| Characteristic value | | Example 1 | Example 2 | Example 3 | Example 4 | Comparative Example 1 | Comparative Example 2 | Comparative Example 3 |
|---|---|---|---|---|---|---|---|---|
| Composition (% by weight) | organic amine-treated vermiculite | 69.2 | 69.2 | 69.2 | 69.2 | — | — | — |
| | ceramic fiber | 25.0 | 25.0 | 25.0 | 25.0 | 29.0 | 25.0 | 30.0 |
| | natural organic fiber | 1.0 | 1.0 | 1.0 | 1.0 | — | 1.0 | — |
| | organic binder | 2.8 | 2.8 | 2.8 | 2.8 | 9.0 | 2.8 | 5.0 |
| | inorganic binder | 2.0 | 2.0 | 2.0 | 2.0 | 2.0 | 2.0 | — |
| | untreated vermiculite | — | — | — | — | 60.0 | 69.2 | 64.0 |
| Properties | hot air erosion time (hr) | 5.0 (no erosion) | 5.0 (no erosion) | 5.0 (no erosion) | 5.0 (no erosion) | 0.9 (escape of material) | 1.2 (escape of material) | 0.3 (escape of material) |
| | coefficient of free expansion at 700° C. (%) | 354 | 347 | 336 | 350 | 270 | 299 | 285 |
| | expansion pressure (kg/cm²) 200° C. | 0.4 | 0.4 | 0.4 | 0.4 | 1.0 | 1.1 | 1.0 |
| | 300° C. | 3.0 | 2.2 | 2.1 | 3.0 | 1.9 | 1.8 | 1.9 |
| | 400° C. | 12.0 | 9.4 | 8.9 | 12.0 | 4.8 | 4.0 | 3.2 |
| | 500° C. | 15.0 | 11.5 | 11.0 | 15.0 | 7.0 | 7.0 | 5.0 |
| | 600° C. | 17.5 | 12.6 | 12.4 | 17.5 | 9.2 | 8.2 | 6.5 |
| | 700° C. | 18 up | 15.0 | 14.6 | 18 up | 8.4 | 9.5 | 7.4 |
| | coefficient of re-expansion (%) 4 hrs. | 145 | 135 | 133 | 145 | 48 | 80 | 55 |
| | 6 hrs. | 140 | 125 | 115 | 140 | 35 | 62 | 40 |
| | 8 hrs. | 125 | 110 | 100 | 125 | 30 | 45 | 32 |
| | 10 hrs. | 120 | 100 | 85 | 120 | 20 | 25 | 21 |

As understood from the above examples and comparative examples, the present sheet material has excellent properties as follows:

(1) As shown in the above table, it was found as the result of the hot air erosion model test to evaluate the continuous durability using an exhaust gas pattern of engine that no escape of the material was recognized at all in the present sheet material. As understood from Comparative Example 3, a sheet material containing than those of the present invention and Comparative Example 2.

As has been described heretofore, the sheet material of the present invention, showing extremely excellent properties compared with those of the conventional sealing materials based on its large coefficients of free expansion and re-expansion and high expansion pressures at high temperatures, can be advantageously applied as the sealing material for exhaust gases in a catalyst converter. It is also expected that the present sheet material has a remarkably wide application for packing materials around the burners for gas or petroleum combustors, sealing materials for high-temperature gases and fire-resistant safes and constructional materials, and other industrial materials.

What is claimed is:

1. In a heat-resistant, highly expansible sheet material for supporting a catalyst carrier comprising 40 to 80% by weight of an unexpanded vermiculite, 10 to 50 by weight of an inorganic fiber having a crystalization temperature of not lower than 850°C., 0.1 5% by weight of a natural organic fiber, 0.1 to 5 % by weight of an inorganic binder and 0.1 to 4% by weight of an organic binder, the improvement wherein at least a part of cations contained between layers of said unexpanded vermiculite is replaced by an alkylammonium ion.

2. The sheet material according to claim 1, wherein said alkylammonium ion is an alkylammonium ion dissociated from at least one of primary to tertiary amines.

3. The sheet material according to claim 2, wherein said amine selected from primary to tertiary amines is at least one betaine, alkylamine acetates and alkylamine hydrochlorides.

4. The sheet material according to claim 1, wherein said alkylammonium ion is an alkylammonium ion dissociated from at least one of laurel alkylammonium betaine, alkylglycine, tetradecylamine acetate and dodecyltrimenthylammonium chloride.

5. The sheet material according to claim 1, wherein a pressure of 10 kg/cm$^2$ or more is required to compress said sheet material until the thickness of said sheet material is decreased by 10% at a temperature 600°–700°C.

6. The sheet material according to claim 1, which re-expands in such a manner that the thickness of said sheet material exceeds 150% of a predetermined clearance of a jig, with which said sheet material is clamped, after said sheet material has been heated at 600° C. for 10 hours, cooled, released from said jig, and again heated 700° C. for re-expansion.

7. A process for the preparation of a heatresistant, highly expansible sheet material for supporting a catalyst carrier, comprising a sequence of the following steps (a) through (f):
   (a) a step of immersing an unexpanded vermiculite in an aqueous solution containing alkali metal ions, drawing up said vermiculite therefrom, immersing said vermiculite in an aqueous solution of an organic amine salt, and drying said vermiculite;
   (b) a step of blending 40 to 80% by weight of the vermiculite obtained in step (a), 10 to 50% by weight of inorganic fiber, 0.1 to 4% by weight of an organic binder, and 0.1 to 4% by weight of an inorganic binder to prepare a slurry solution;
   (c) a step of preparing a slurry solution by incorporating 0.1 to 5% by weight of beaten natural organic fiber in water;
   (d) a step of forming a sheet material from a mixture of the slurry solutions obtained in steps (b) and (c) by paper-making process;
   (e) a step of compressing said sheet material in a wet state by flattening; and
   (f) a step of drying said sheet material.

8. A process for the preparation of a heatresistant, highly expansible sheet material for supporting a catalyst carrier, comprising a sequence of the following steps (a) through (g):
   (a) a step of immersing an unexpanded vermiculite in an aqueous solution containing alkali metal ions, drawing up said vermiculite therefrom, and drying said vermiculite;
   (b) a step of blending 40 to 80% by weight of the vermiculite obtained in step (a), 10 to 50% by weight of inorganic fiber, 0.1 to 4% by weight of an organic binder, and 0.1 to 4% by weight of an inorganic binder to prepare a slurry solution;
   (c) a step of preparing a slurry solution by incorporating 0.1 to 5 % by weight of beaten natural organic fiber in water;
   (d) a step of forming a sheet material from a mixture of the slurry solutions obtained in steps (b) and (c) by paper-making process;
   (e) a step of compressing said sheet material in a wet state by flattening;
   (f) a step of impregnating the wet sheet material obtained in step (e) or the dried sheet material with an aqueous organic amine salt solution; and
   (g) a step of drying said sheet material.

* * * * *